(12) United States Patent
Sharp

(10) Patent No.: US 11,371,405 B2
(45) Date of Patent: *Jun. 28, 2022

(54) ROAD-TRANSPORTABLE GENSET EMISSIONS REDUCTION SYSTEM

(71) Applicant: Robert John Sharp, Camarillo, CA (US)

(72) Inventor: Robert John Sharp, Camarillo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/324,361

(22) Filed: May 19, 2021

(65) Prior Publication Data
US 2021/0270164 A1 Sep. 2, 2021

Related U.S. Application Data

(63) Continuation-in-part of application No. 16/200,000, filed on Nov. 26, 2018, now Pat. No. 11,066,971, (Continued)

(51) Int. Cl.
*F01N 3/022* (2006.01)
*F01N 3/029* (2006.01)
(Continued)

(52) U.S. Cl.
CPC ....... *F01N 3/0222* (2013.01); *B01D 46/2418* (2013.01); *B01D 53/9431* (2013.01); (Continued)

(58) Field of Classification Search
CPC ........ F01N 3/0222; F01N 3/027; F01N 3/029; F01N 3/2066; F01N 3/2825; F01N 2330/06; F01N 2370/04; F01N 2510/063; F01N 2610/02; F01N 3/035; F01N 2260/06; F01N 2450/10; F01N 2590/10; F01N 3/021; F01N 3/04; B01D 46/2418; B01D 53/9431; B01D 2255/20707; B01D 2255/20723; B01D 2255/20738; B01D 2255/20761; B01D 2255/50; B01D 2279/30; B01D 2257/504; B01D 2258/012; B01D 53/9477; F16L 1/065; F02B 63/044; Y02T 10/12
See application file for complete search history.

(56) References Cited

U.S. PATENT DOCUMENTS 8,721,771 B2 * 5/2014 Duesel, Jr. ............. B01D 45/08
95/272
11,066,971 B1 * 7/2021 Sharp ................... F02B 63/042
(Continued)

OTHER PUBLICATIONS

Article titled "A Brief Overview of Ship's Auxiliary Engine" by Raunek Kantharia and published in Aug. 2016. (Year: 2016).*
(Continued)

*Primary Examiner* — Michael C Zarroli

(57) ABSTRACT

Given that power blackouts occur very infrequently, a TRANSportable GENset emissions reduction system (XGEN) that fixes a larger and more significant problem of reducing emissions from routine periodic testing of gensets, whereas the system may be scheduled to be shared by a multitude of gensets, thereby reducing costs through efficient use of capital expenditures while also increasing the quality of emissions reductions as compared to applying individual exhaust treatments each genset.

20 Claims, 6 Drawing Sheets

Related U.S. Application Data which is a continuation-in-part of application No. 62/590,637, filed on Nov. 26, 2017.

(51) Int. Cl.
    *F01N 3/027*     (2006.01)
    *F01N 3/20*     (2006.01)
    *B01D 46/24*     (2006.01)
    *F01N 3/28*     (2006.01)
    *B01D 53/94*     (2006.01)
    *F16L 1/06*     (2006.01)

(52) U.S. Cl.
    CPC ............. *F01N 3/027* (2013.01); *F01N 3/029* (2013.01); *F01N 3/2066* (2013.01); *F01N 3/2825* (2013.01); *B01D 2255/20707* (2013.01); *B01D 2255/20723* (2013.01); *B01D 2255/20738* (2013.01); *B01D 2255/20761* (2013.01); *B01D 2255/50* (2013.01); *B01D 2279/30* (2013.01); *F01N 2330/06* (2013.01); *F01N 2370/04* (2013.01); *F01N 2510/063* (2013.01); *F01N 2610/02* (2013.01); *F16L 1/065* (2013.01)

(56) References Cited

U.S. PATENT DOCUMENTS

| | | | | |
|---|---|---|---|---|
| 2006/0213197 | A1* | 9/2006 | Caro | F01N 13/009 60/685 |
| 2011/0265449 | A1* | 11/2011 | Powell | F23J 11/00 60/272 |
| 2012/0102929 | A1* | 5/2012 | Beissler | F01N 13/00 60/297 |
| 2012/0141351 | A1* | 6/2012 | Denzer | B01D 53/8668 423/400 |
| 2017/0342883 | A1* | 11/2017 | Tonsich | B01D 53/62 |

OTHER PUBLICATIONS

YouTube video titled "Harmony of the Seas Cruise Ship Leaving Port Everglades Royal Caribbean Dec. 2016 Part 4" by Jordan Mowbray, published on Jan. 8, 2017, and available at https://www.youtube.com/watch?v=bPiAHeKRI7Q. (Year: 2017).*

Article titled "Is 'The Cloud' just air pollution?" by Bob Sharp, published on Dec. 7, 2018, and available at https://www.linkedin.com/pulse/cloud-just-air-pollution-bob-sharp. (Year: 2018).*

YouTube video titled "STAX Engineering—2019 Pepperdine Highly Promising Companies" by Pepperdine Graziadio Business School, published on Nov. 7, 2019, and available at https://www.youtube.com/watch?v=pdb19UkyxUQ. (Year: 2019).*

* cited by examiner

ROAD-TRANSPORTABLE GENSET EMISSIONS REDUCTION SYSTEM

CROSS-REFERENCE TO RELATED APPLICATIONS

This application further claims the benefit of NPA Ser. No. 16/200,000, filed Nov. 26, 2018 by the present inventor, which is incorporated by reference, which in turn claims the benefit of PPA Ser. No. 62/590,637, filed Nov. 26, 2017 by the present inventor, which is incorporated by reference.

BACKGROUND

Many businesses require at least one backup genset to provide electrical power when the electrical utility fails. Most of these backup gensets use diesel fuel. Backup gensets only operate during periodic testing and during blackouts. However, many local communities are becoming increasingly annoyed when these diesel gensets operate because they produce harmful air contaminants and noise. These harmful air contaminants include, among others, particulate matter (PM), oxides of nitrogen (NOx), volatile organic compounds (VOC's), reactive organic gases (ROG), and carbon dioxide ($CO_2$). Most of the older diesel gensets have no emissions treatment system installed. Most new diesel gensets have insufficient emissions treatment systems installed. Many diesel gensets produce a very noticeable black plume, especially in the first minutes after startup. Although regulators have been tightening emission regulations for new installations, the pre-existing gensets continue to pollute.

Backup gensets are used where the main source of electrical power is from the grid. When there is a grid failure, then the grid is disconnected, and the backup gensets go through a starting sequence which takes some time and the backup gensets supply the electrical power for the load instead of the grid. When the grid becomes available again, then the grid is reconnected and the backup gensets are shut down. Backup gensets are constructed differently and are power-rated differently, this is because prime power gensets run continuously, maybe months at a time, while backup gensets mostly only run during short periodic (e.g. monthly) testing and during an infrequent power outage.

Backup gensets, also known as standby generators or standby gensets or emergency power systems, are intended to be used during electrical utility blackouts only. However, backup gensets still need to be started periodically every few weeks to test them to check if they are operational and to keep their engines in good operating condition. However, affected local communities are becoming increasingly intolerant of diesel emissions due to increasing evidence that diesel emissions can cause cancer and other health problems. Even a limited amount of diesel emissions during periodic testing can cause significant concern to those living in nearby communities, especially when there is a high concentration of backup gensets in locations such as datacenters. Power blackouts infrequently occur in the developed world, so the larger and more significant problem is the routine periodic cold startups of backup gensets.

Gensets are classified as either prime power or backup power. Prime power gensets are used as the primary source of power. Examples of prime power gensets are used in oceangoing vessels (OGV's), power plants, or remote locations where grid power is not available. Backup power gensets are used in locations where electrical power is normally available from the utility or electrical grid, but when the utility or electrical grid temporarily fails to supply power, the backup genset(s) take over. The emissions from prime power gensets are continuous, while emissions from backup gensets are periodic.

The gensets used in oceangoing vessels (OGV's) are called "auxiliary engines". The auxiliary engines on oceangoing vessels are prime power gensets that are never connected to the grid. Auxiliary engines supply all the vessel's electrical power. There are typically four auxiliary engines on a vessel, and number of auxiliary engines operating depending on the vessel's electrical load. The vessel's electrical load changes in response to different modes of operation. There are typically two auxiliary engines operating at the same time in parallel. Certain auxiliary engines may be selected to operate to distribute the operating hours on each auxiliary engine or to allow a particular auxiliary engine to be switched off for service. An auxiliary engine on a vessel may be configured to be a backup (i.e., starting up when a power failure occurs), but this would be an atypical use of auxiliary engines. Typically, a plurality of auxiliary engines are operated concurrently, so that if one auxiliary engine shuts down, the other absorbs the load. Thus, auxiliary engines on an oceangoing vessel are typically operated at less than 50% capacity so that if one auxiliary engine shuts down, the other has sufficient capacity to supply enough power so there is no power interruption. Thus, auxiliary engines are not used as backup gensets because of the risk of a blackout on the vessel and are thereby not used as backup gensets.

Land-based backup gensets and auxiliary engines on oceangoing vessels (OGV's) are two examples of gensets which produce air pollution emission that are particularly harmful under certain conditions. Land-based backup gensets are most harmful when they are periodically tested. OGV auxiliary engines are most harmful when the OGV is at-berth near dense population centers at a port. A solution is needed to reduce these particularly harmful emissions when these certain conditions occur.

Air pollution regulators classify emissions sources classified as either stationary or mobile. Examples of mobile sources include automobiles, trucks, locomotives, and oceangoing vessels (OGV's). Mobile equipment can be moved via roads or waterways. Examples of stationary sources include backup gensets, power plants, refineries, and industrial facilities. In California, mobile emissions sources are typically regulated by the Environmental Protection Agency (EPA) and/or the California Air Resources Board (CARB), while stationary sources are regulated by local districts, such as the South Coast Air Quality Management District (AQMD). The reason for this is that mobile sources move between geographic regions and therefore must be regulated by institutions that cover a broader geographic region than the local districts. Thus, backup gensets are considered stationary sources and auxiliary engines on oceangoing vessels (OGV's) are considered mobile sources for regulatory purposes.

An example of stationary source regulation is the SCAQMD requiring that all backup diesel gensets be fitted with expensive "Tier 4" emissions reduction devices, which significantly increases (nearly doubles) the cost of the backup genset.

An example of a mobile source regulation is the CARB regulation of OGV's at berth (the CARB At-Berth Regulation) requiring vessels visiting California ports to either turn off their auxiliary engines and plug into grid power ("shore power", "cold ironing", or alternative maritime power "AMP") or purify the emissions from running auxiliary engines using an Emissions Reduction as a Service (ERaaS) apparatus.

The most significant pollutants from diesel engines are particulate matter (PM), oxides of nitrogen (NOx), oxides of sulfur (SOx), reactive organic gas (ROG), and carbon dioxide ($CO_2$).

Particulate Matter (PM), commonly known as "soot," is the most important pollutant due to its dangerous health effects to the local population. PM is produced by the incomplete combustion of fuel. PM is especially visible as the "black cloud" that can be seen for miles when a genset is started. It is a major element of soot, which is one of the deadliest forms of widespread air pollution. PM is linked to heart attacks and strokes, cancer, developmental effects in children, and premature death. PM in the form of black carbon is the second-largest greenhouse gas after carbon dioxide. Black carbon leads to decreased agricultural productivity because it influences the formation of clouds and disrupts participation patterns, and it rapidly increases the rate of ice melt in the Arctic. Removing one ton of diesel black carbon from the atmosphere, for example, is equivalent to removing roughly 3,200 tons of carbon dioxide pollution. Black carbon is considered a "super pollutant", or as otherwise known as a short-lived climate pollutant (SLCP).

Most existing gensets that are already in service have the disadvantage of not having any PM control. Recently, however, diesel engine manufacturers have been installing PM filters called diesel particulate filters (DPF's) to control PM. Nearly all of these DPF's is made of a ceramic substrate that directly filters the particles. The PM trapped by the DPF is composed of soot (Elemental Carbon (EC), Organic Carbon (OC), absorbed hydrocarbons, and inorganic compounds (metallic abrasion particles, sulfates, and silicates). The mass of the inorganic fraction, however, is very small compared to the organic fraction, especially when ultra-low-sulfur (0.0015%) fuel is used.

DPF's need to be regenerated periodically or they clog up, which can lead to a system shutdown. The DPF regeneration process "completes the combustion" of the organic fraction, converting PM to $CO_2$ and water. The inorganic fraction, however, cannot be regenerated, and this small amount of ash is removed periodically. A "regeneration cycle" is needed periodically, especially if 1) the engine experiences many startups compared to the overall operating time, or 2) the engine runs at a low power level or runs unloaded. The disadvantage of the backup gensets with DPF's is they are frequently exposed to the above conditions (i.e., frequent startups and running at low loads), increasing the likelihood that the DPF will need to be disassembled to remove the ceramic substrate for chemical treatment or a high-temperature bake.

Regeneration can be active or passive. An active regeneration applies additional heat to raise the temperature of the exhaust gas above the minimum regeneration temperature. A passive regeneration cycle does not use external heat but relies on the periodic high-load/high-temperature periods during a normal operating cycle. A passive regeneration typically takes about 2 hours. When operating cycles include more cold starts and idling periods (as is the case for backup gensets), then passive regeneration may not be effective unless special precaution is taken to make sure the generator runs at high loads for extended periods of time.

NOx (NO and $NO_2$) is produced during combustion at high temperatures. In diesel exhaust, most of the nitrogen oxide is in the form of NO. $NO_2$ is produced in much lower concentrations. An average diesel engine produces 500 to 900 ppm NOx. NO, and particularly $NO_2$ can damage the lungs, heart, liver, and kidneys. NOx combines with other substances and creates smog when exposed to sunlight. NOx combines with water which produces nitric acid, which is a cause of acid rain. NOx is also a greenhouse gas.

Most existing gensets have the disadvantage of not having any NOx control at all. Recently, however, diesel engine manufacturers have been installing selective catalytic reduction (SCR) for removing NOx from the exhaust gas. The catalysts used in SCR's must reach a certain temperature to work efficiently during the startup phase, so NOx is not sufficiently controlled during cold starts when backup gensets are tested every few weeks. Thus, even newer backup gensets that include SCR's have the disadvantage of insufficient NOx control when they are tested frequently.

In diesel exhaust, most of the oxides of sulfur (SOx) is in the form of $SO_2$. A portion of the $SO_2$ will react with the water and form $H_2SO_4$ (sulfuric acid). Fuel quality is directly related to $SO_2$ emissions. The lower the sulfur content in the fuel, the lower the $SO_2$ emissions. $TSO_2$ and $H_2SO_4$ are irritants of the respiratory system, are odorous, contribute to acid rain, and can form fine PM from combination with oxygen (sulfates).

"Volatile organic compounds" or VOC's are commonly defined as compounds with a vapor pressure greater than 0.1 millimeter of mercury as a determinant of volatility, excluding a list of exempted compounds having "negligible photochemical reactivity".

Reactive Organic Gas is commonly defined as total organic gas (TOG) less "exempt compounds" such as methane, CFCs, etc. or TOG less the fraction of reactive organic gas (FROG). TOG means compounds of carbon, excluding carbon monoxide, carbon dioxide, carbonic acid, metallic carbides or carbonates, and ammonium carbonate. Reactive organic carbon (ROC) species are the fuel of the chemistry of the atmosphere, dominating short-lived emissions, reactivity, and the secondary production of key species such as ozone, particulate matter, and carbon dioxide.

Although $CO_2$ is not classified as a toxic emission and is typically not regulated, $CO_2$ is a greenhouse gas (GHG), which is quickly becoming important worldwide. As noted, PM is a super pollutant that is roughly 3,200 times as potent as $CO_2$ as a greenhouse gas. Practically no gensets have individual $CO_2$ reduction systems installed.

Gensets also can have the disadvantage of being noisy. Some gensets have mufflers installed, but large gensets still produce a significant amount of noise, even with mufflers installed, which can be annoying to nearby residents.

Retrofitting existing in-service backup gensets with emissions treatments has the disadvantage of being very expensive due to the inefficiency of adding an emissions treatment after the fact as compared to a factory-installed emissions treatment. Furthermore, genset retrofits have the disadvantage of requiring multiple capital expenditures—one for each installed genset. Furthermore, these expensive retrofits have the disadvantage of being only partially effective during routine periodic testing as described above. Thus, costly and ineffective genset retrofits may discourage the installation of emissions treatments, leading to increased PM and NOx emissions. Furthermore, practically all retrofits have the disadvantage of not reducing SOx and $CO_2$ emissions.

An Emissions Reduction as a Service (ERaaS) system can eliminate the need for retrofitting every genset. However, prior ERaaS systems are "moveable" but not "road-transportable" on public roads and have been limited to oceangoing vessels (OGV's). Prior art systems are too large to be transported from one genset to another over public roads, thereby preventing emissions reductions from gensets separated by public roads, such as gensets at different datacenters and OGV gensets in different terminals. In the case of maritime prior art systems, they are limited to barge operation or limited to a single wharf area. Thus, prior art approaches have been extremely limited and the vast majority of gensets continue to produce harmful emissions.

For the purposes of the present application, "road-transportable" means compatible with road transportation, transportable on standard roads or on ordinary roads or via public roads, and compatible with road transportation. In contrast, prior art systems are shipped in pieces to a private location, such as a shipping terminal, and assembled on site. However, once assembled, the prior art system may only be moved within a private area, such as alongside a ship at-berth. Prior art systems, once assembled, are too large to be transported on public roads, thereby severely restricting their usefulness.

The land-moveable prior art, once assembled on-site, cannot be transported on public roads, even with special permits, mostly because they are too tall to fit under bridges. Prior art land-moveable systems comprise two approximately 53-foot container-sized frames mounted one on top of the other. Although these two approximately 53-foot containers may be transported by public road individually, they cannot be transported on public roads when mounted one on top of the other.

According to the applicant-supplied IDS reference, "Shipping Container Reference", commercially-available shipping containers (per the internationally-accepted CSC and ISO standards) have lengths from 10' to 45' to 53' (see pages 243 to 244), a width of 8' (see page 244), and heights between 8' to 9'-6" (see page 244). Thus, shipping containers are less than 53' long, less than 8' wide, and at least 8' high but less than 9'-6" high. The prior art land-moveable systems are comprised of two container-sized frames, two-high, plus aspects extending outside of the double-high frame including at least one exhaust stack, railing, and interconnecting ducting. The prior art recites an emissions control system positioned within a housing having an upper and lower level. The prior art claims that both the upper and lower level includes a platform allowing a user to stand on the platform, which further confirms that each level (each housing) is the height of a shipping container. Thus, conservatively the overall prior art housing must be twice the size of a shipping container or 2×8=16 (sixteen) feet tall. However, in California, for example, under the California Air Resources Board (CARB) jurisdiction, no vehicle or load shall exceed a height of 14 feet measured from the surface upon which the vehicle stands, according to the California Vehicle Code (CVC) Section 35250. Thus, the prior art is not road transportable in the State of California where the prior art currently operates. Note that all state regulations vary between 13.5' to 14' maximum height, which is less than the prior art's at least 16-foot height.

Prior art land-moveable systems have a footprint of 8.5' by 52.5' which corresponds to the largest non-permit transportable footprint within the united states (footprint, not height). However, an 8.5' width is larger than a standard ISO shipping container (see IDS shipping container reference, section 6.6, page 244). Furthermore, the prior art states that aspects of the emissions control system may be substantially (i.e., not completely) contained within a housing. Furthermore, there aspects shown in the figures of the prior art which extend outside of the housing, further extending beyond the 8.5' width. Thus, using the disclosed dimensions of the prior art, the prior art housing is at least 12-feet wide. Thus, the prior art is not a road-transportable apparatus, but instead an apparatus that is only movable within a dock or marine terminal once it is assembled on-site.

Prior art systems have a further disadvantage that supporting infrastructure must also be moved along with the main body of the system. For example, a fuel tank, control room, generator, and liquified natural gas tank would need to be moved separately from the main system body. Thus, a logistics "deployment" is necessary to move the prior art, requiring moving numerous components from one location to another.

Prior art systems have a further disadvantage that special "yard tractors" are used to move the processing system within a private area. Yard tractors are not compatible with public roads. Yard tractors are also called yard dogs, yard goats, yard jockeys, hostlers, stevedoring tractors, utility tractor rigs (UTR's), or port tractors. Yard tractors, in marine operations, are trucks used in moving trailers and containers short distances around freight terminals, port facilities, warehouses, other facilities, and in and out of oceangoing vessels.

The container trailers used to move prior art systems are not public road compatible. Modern road-compatible container chassis can be adjusted in length, to accommodate 20-foot, 40-foot, 45-foot containers where each corner of the container is secured to the chassis by means of twistlocks, which are fixed to the trailer. In contrast, the prior art uses "roll trailers" which are vehicles to transport cargo on companies' premises, not on public roads. Furthermore, roll trailers have small, low-speed, wheels on one end only, and are not fitted with twistlocks for securing standard shipping containers for transport on public roads.

The U.S. Department of Transportation (DOT) has information on the maximum permissible dimensions for vehicles to be road transportable. States vary, but the DOT lists the information for each state under the Government Accountability Office (GAO). The IDS contains information specifically for California, since the prior art indicates that the system will be used to meet the California At-Berth Regulation. However, other states are similar (see GAO-15-236 below). The IDS reference sets the maximum legal width is 102 inches (8.5 feet), the maximum legal height is 14 feet, and the maximum legal length for is 65 feet including the tractor.

The IDS reference GAO-15-236 includes vehicle dimension information for the entire United States. This document shows on page 4 that a typical tractor-semitrailer vehicle is about 13'-6" tall including the chassis. The IDS reference GAO-15-236 on page 16 states that 29 states set maximum vehicle height at 13 feet 6 inches, while the other 21 states set maximum vehicle height at 14 feet to 15 feet. Thus, the prior art height (even ignoring the roll trailer) exceeds the maximum height for every state. Thus, the prior art is not road transportable.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
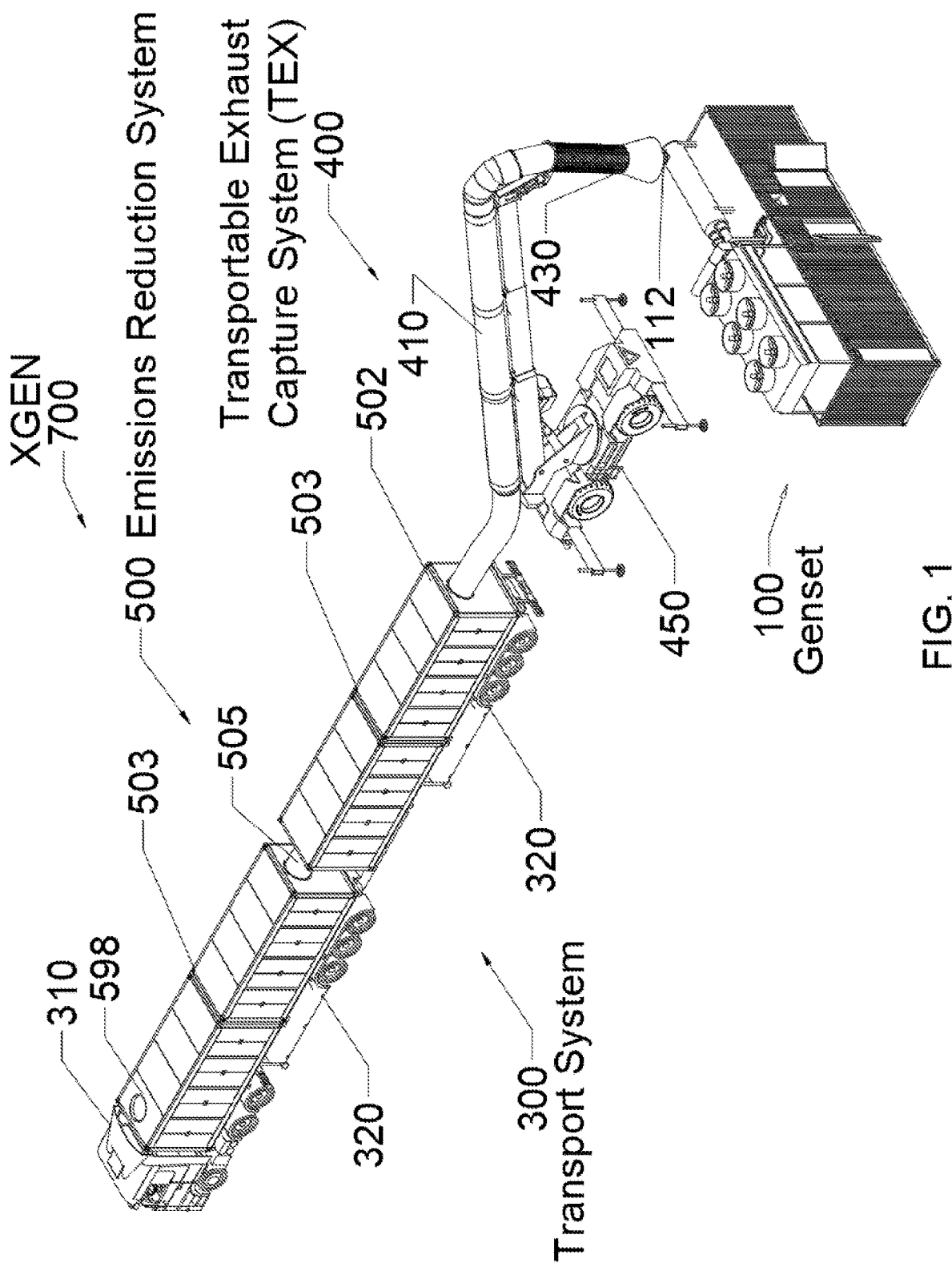
FIG. 1 shows a perspective view of an exemplary embodiment of a TRANSportable GENset emissions reduction system (XGEN) connected to an exemplary genset 100.

FIG. 1 shows an exemplary embodiment of a transportable genset emissions reduction system (XGEN) 700 connected to an exemplary genset 100. XGEN 700 is road transportable and can service multiple emissions sources that are separated by public roads. Genset 100 may be a typical motor-generator set and may be part of an emergency power system (backup generator or standby generator) for homes, hospitals, scientific laboratories, data centers, telecommunication equipment. Genset 100 may also be part of the auxiliary engine in a boat, ship, or oceangoing vessels. Genset 100 may represent either a) a single exhaust pipe of a single genset, b) a plurality of gensets with a corresponding plurality of exhaust pipes that are located in the same general vicinity or c) a plurality of gensets with a single shared exhaust pipe that combines the exhaust from the gensets.

Emissions from genset 100 exit via exhaust pipe 112. Transportable exhaust capture system 400, also known as TEX, provides a conduit for exhaust gas emitted from exhaust pipe 112 to emissions reduction system inlet 502 via connector 430 and transportable exhaust capture system duct 410. The components of an exemplary embodiment of emissions reduction system 500 are housed in at least one exhaust treatment containers 503. If multiple exhaust treatment containers 503 are used, then they are connected in series by interconnecting duct 505. Emissions reduction system 500 is mounted on transport system 300 comprising truck 310 and chassis 320.

Truck 310 may be electric, hydrogen-powered, or a conventional internal combustion engine fueled by renewable diesel.

The source of power for the operation of emissions reduction system 500 may be provided by a PTO generator on truck 310, a local electrical receptacle, an electrical storage, or a clean power source, for example. The power source for emissions reduction system 500 may also be used for exhaust capture system 400, or exhaust capture system 400 (TEX) may be powered temporarily and for a short time by PTO power from a truck associated with the TEX.

In an alternative exemplary embodiment, multiple emissions sources located within the same vicinity may be treated in parallel by duplicating the circuit comprising connector 430, duct 410, and exhaust treatment container 503, and a TEX 400 configured to support a plurality of connectors 430 and a plurality of ducts 410, where each connector 430 is placed on a different exhaust pipe 112.

A disadvantage of non-ERaaS prior art emissions control systems is that a single emissions control system can only service one genset (1-to-1 instead of 1-to-many) in the case where only one genset needs to operate at a time. This is because 1) each emissions control system is continuously connected to each genset, 2) an emissions control system is stationary (fixed) and is therefore limited to a single emissions source, and/or 3) an emission control system that is too large to be transported on roads without special permits and cannot connect to additional gensets.

In one exemplary embodiment, exhaust treatment container 503 is designed to be the same size and have compatible mounting fittings as commercially-available shipping containers. Thus, container 503 is compatible with IDS reference, "Shipping Container Reference", where commercially-available shipping containers (per the internationally-accepted CSC and ISO standards) have lengths from 10' to 20' to 40' to 45' to 53' (see pages 243 to 244), a width of 8' (see page 244), and heights between 8' to 9'-6" (see page 244). Furthermore, to maintain road-transportability, containers 503 are not stacked, one on top of the other, when transported, which would otherwise cause the overall height to exceed the 13.5-foot to 14-foot maximum height limit, including chassis, for all states within the United States.

In one exemplary embodiment, chassis 320 is a modern shipping container chassis (also known as a skeletal trailer) that may be adjusted in length, to accommodate 20-foot, 40-foot, 45-foot or longer containers. Each corner of container 503 is secured to chassis 320 by twistlocks, thereby fixing container 503 to chassis 320.

In one exemplary embodiment, truck 310 is a common truck that is compatible for use on public roads (unlike the prior art which uses a yard truck, which is not for use on public roads). Truck 310 is compatible with transportation over long distances (e.g., greater than ten miles) over common roads and public highways.

Thus, truck 310 and chassis 320 are commercially available to transport the ISO-shipping-container-compatible containers 503. The overall width of chassis 320 and container 503 combined is 8.5-feet or less. The overall height of chassis 320 and container 503 combined is less than 14-feet.

Therefore, an exemplary embodiment of transport system 300, comprising truck 310, chassis 320, and exhaust treatment containers 503 has the advantage of being road-transportable and compatible with road transportation, thereby allowing XGEN 700 to easily move from genset to genset on ordinary roads and allowing XGEN 700 to be applied to multitude of gensets that may be scheduled to run at different times. The ability to periodically test a multitude of gensets using a pre-determined schedule provides the advantage of efficient use of capital expenditures, thereby significantly improving the cost-effectiveness for reducing pollution within a local geographic area that contains a multitude of gensets. Furthermore, an embodiment of XGEN 700 that conforms to internationally-accepted (e.g. ISO) shipping container standards has the advantage of fast and inexpensive shipment to any location in the world via container trucks, container trains, and container ships, thereby eliminating expensive and time-consuming modifications to a large number of gensets 100.

An exemplary embodiment of transportable exhaust capture system (TEX) 400 may be any mobile or driving crane known in the art (e.g., Lieber, Manitowoc, Terex, Grove, or Link-Belt) that can be transported/driven on regular roads with attached ducting system. Another exemplary embodiment of TEX 400 is a driving telescopic crane with a plurality of parallel circuits of telescopic ducting. Yet another exemplary embodiment of TEX 400 may be an articulating or a combination of articulating and telescopic crane. Yet another exemplary embodiment of TEX 400 is an articulating mobile crane that is a converted concrete pumping crane (e.g., Putzmeister, Schwing, or KCP). Yet other alternative exemplary embodiments of TEX 400 for small, easy-to-reach exhaust pipes, is manual connection or a forklift. Yet another alternative exemplary embodiment is a plurality of fixed or semi-fixed capture systems which connect one at a time to a single transportable emissions reduction system 500. Yet another alternative exemplary embodiment of TEX 400 is connecting to multiple gensets via a single exhaust pipe, thereby eliminating the need to move between connections.

TEX 400 is configured for transportation on public roads, and therefore measures less than 8.5-feet wide (or 10-feet wide with permit), less than 14-feet high, and less than 65' long.

Figure 2:
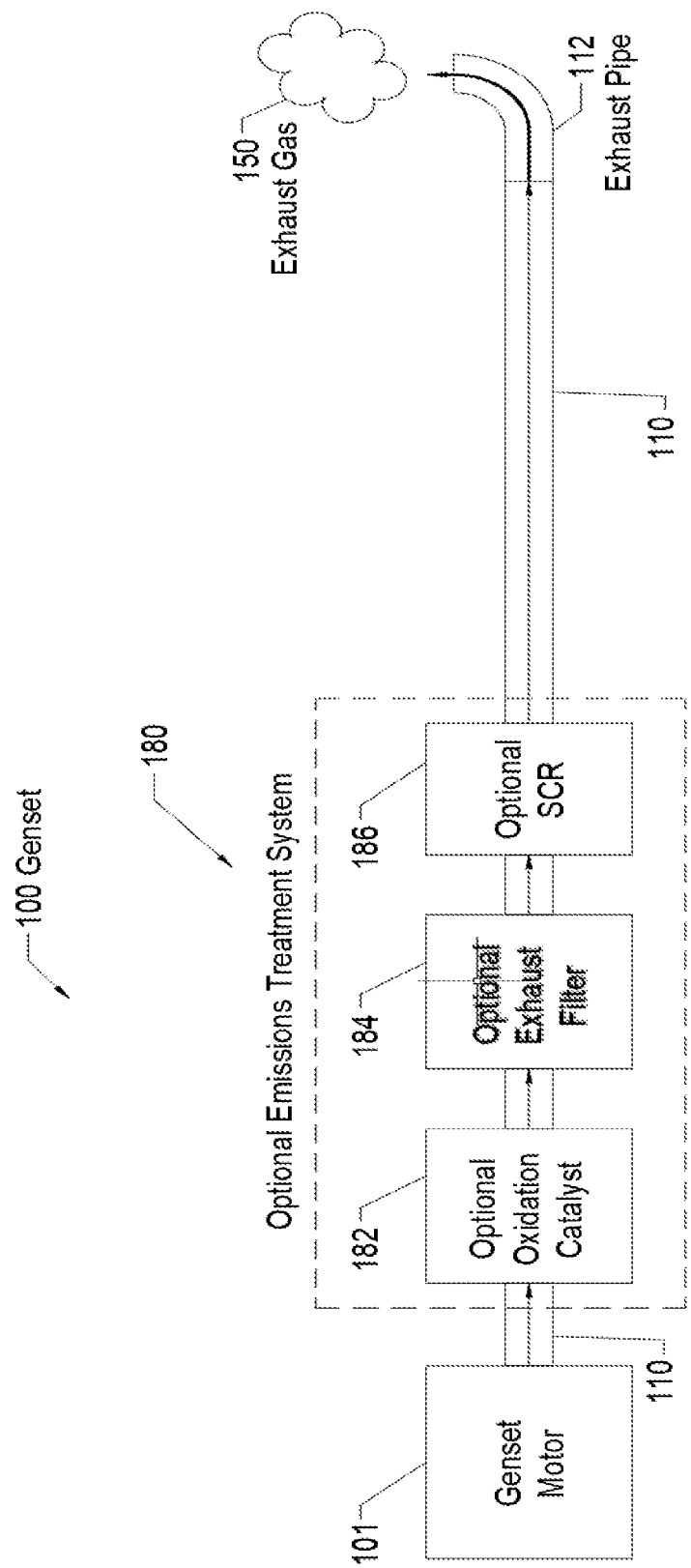
FIG. 2 is a block diagram showing a genset 100 with an optional genset emissions treatment 180 installed.

FIG. 2 shows a typical backup genset 100 connected to an exhaust pipe 112 by exhaust duct 110. If an optional exhaust treatment 180 is used, then optional exhaust treatment 180 is inserted between backup genset 100 and exhaust pipe 112. Optional exhaust treatment 180 may contain but is not limited to, an optional oxidation catalyst, an optional exhaust filter, and an optional selective catalytic reduction reactor (SCR). Optional exhaust treatments 180 typically have a disadvantage of a relatively low reduction efficiency (e.g., 70% to 90%), which has the disadvantage that significant pollution is released to the atmosphere. SOx scrubbers and $CO_2$ scrubbers are not used on individual backup gensets, because it would not be cost-effective. Thus, a disadvantage of gensets without optional exhaust treatments 180, and even gensets with optional exhaust treatments 180 is that unnecessary PM, NOx, SOx, and $CO_2$ pollution is released into the atmosphere.

Figure 3:
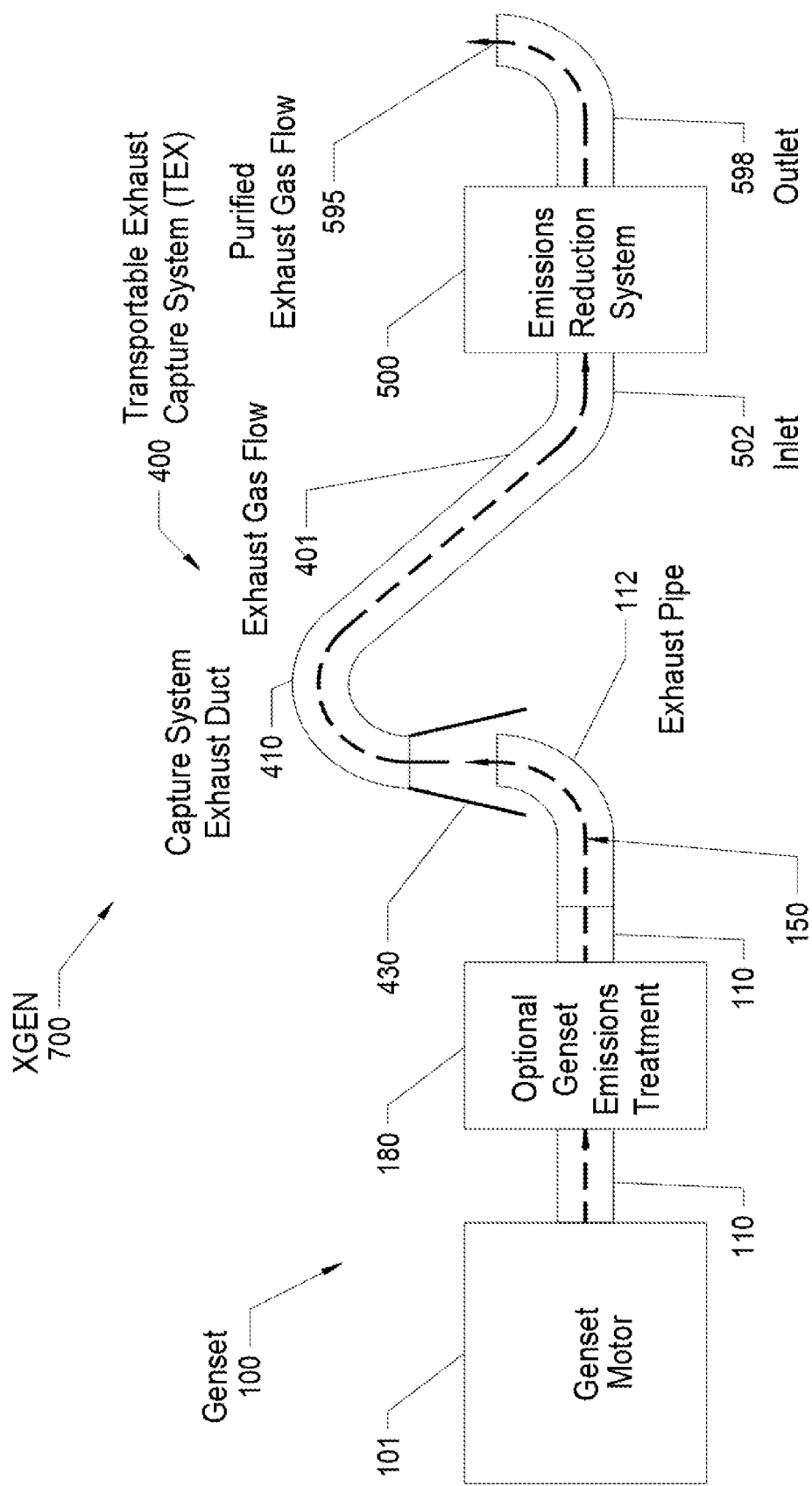
FIG. 3 is a block diagram showing an exemplary embodiment of a TRANSportable GENset emissions reduction system (XGEN) 700 connected to a typical genset 100 with optional genset emissions treatment 180.

FIG. 3 shows a block diagram of an exemplary embodiment of a transportable genset emissions reduction system (XGEN) 700 including transportable exhaust capture system (TEX) 400 and emissions reduction system 500 connected to a typical genset 100 with optional genset emissions treatment 180. TEX 400 is shown connected to exhaust pipe 112 of genset 100 with connector 430. An exemplary embodiment of connector 430 may be an inverted funnel. An alternative exemplary embodiment of connector 430 is to slip flexible duct over the exhaust pipe. An optional modification to an exemplary embodiment of connector 430 is to include a permeable mechanical limit to prevent exhaust pipe 112 from extending too far into connector 430. Another optional modification to an exemplary embodiment of connector 430 is to include an expanding volume to fill the space between exhaust pipe 112 and connector 430. Another exemplary embodiment of connector 430 is a hood that may be lowered over exhaust pipe 112. Exhaust gas 150 is shown contained by exhaust duct 110. Exhaust gas flow 401 is shown contained by capture system exhaust duct 410. Capture system exhaust gas duct 410 connects to emissions reduction system 500 via emissions reduction system inlet 502. Emissions reduction system outlet 598 provides an exit path for purified exhaust gas flow 402 to the atmosphere.

Figure 4:
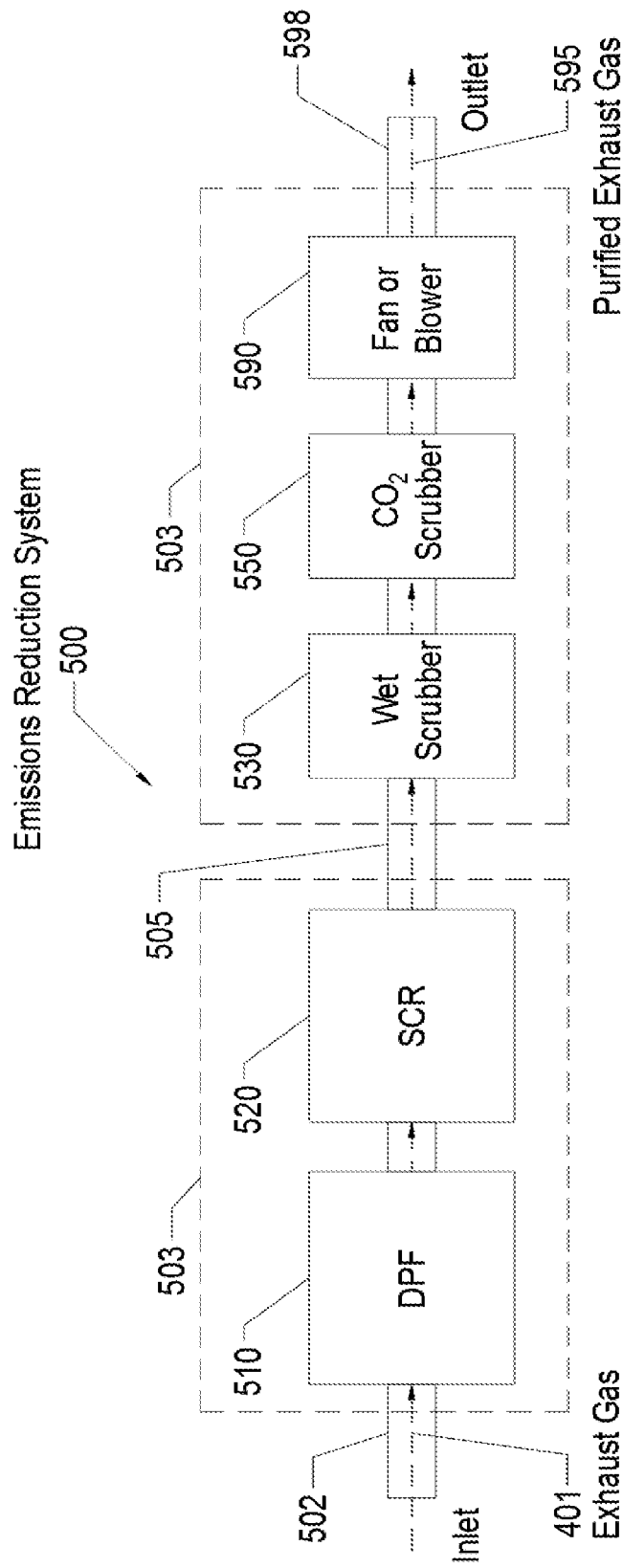
FIG. 4 is a block diagram of an exemplary embodiment of an emissions reduction system 500.

FIG. 4 shows a block diagram of stages of an exemplary embodiment of emissions reduction system 500, which contains an inlet 502 and an outlet 598. Emissions reduction system inlet 502 provides an entrance for exhaust gas 401. Emissions reduction system outlet 598 provides an exit for purified exhaust gas 595. An exemplary embodiment comprises exhaust treatment systems selected from the group consisting of a) of a diesel particulate filter (DPF) 510, a selective catalytic reduction (SCR) 520, an optional wet scrubber 530, an optional $CO_2$ scrubber 550, and a fan/blower 590. The location of fan/blower 590 may be located anywhere along the gas path, including optionally in the upstream container 503. The components of an exemplary embodiment are housed in at least one exhaust treatment container 503. If a plurality of containers 503 are required, then they are connected by interconnecting duct 505. More or fewer containers 503 may be required depending on the amount of equipment that must be housed in containers 503.

Emissions reduction system 500 is designed to meet the specific requirements of the specific application. Thus, emissions reduction system 500 may vary to include additional stages of emissions treatment systems than shown for removing additional pollutants or fewer stages than shown if requirements are not as stringent. For example, an emissions treatment system may be added for reduction of Reactive Organic Gas (ROG). Various numbers of stages, functions of the stages, orders of the stages, or pollutant reduction process in any or all of the stages may be utilized to construct an emissions reduction system 500. The stages shown in this block diagram can be arranged in an alternate order, and each of the stages may reside in any exhaust treatment container 503, and the quantity of exhaust treatment containers 503 may be more or less than shown in FIG. 4.

Exemplar DPF 510 may include, but are not limited to, ceramic honeycomb, catalyst-embedded ceramic filters, thermal oxidizers, ceramic filter elements, high temperature composite ceramic filter, filter elements comprising ceramic fibers, electrostatic precipitators, woven metal or ceramic media, ceramic foams, metal sintered filters, metallic foams, fiber wound filters, fiber knit filters, fiber woven filters, bound ceramic fibers, filter paper, filter felts, filter fleece, carbon filters, HEPA filters, vacuum filters, wall-flow filters and/or partial-flow filters. Regeneration of exemplar DPF 510 may include, but not limited to, passive regeneration, active regeneration, active regeneration using an electrical current through metal media, active regeneration with electric heat, active regeneration with fuel injection combined with an oxidation catalyst, and passive regeneration using $NO_2$ developed from an oxidation catalyst. Exemplary DPF 510 may include but not limited to; a back-flushing capability, whereby the process flow is reversed through at least a portion of the filter elements using dampers, or another flow of gas is introduced to backflush the filter elements.

Unlike the prior art, DPF 510 does not use dry sorbent powder to accumulate on the filter elements for efficient filtering. DPF 510 regenerates PM by converting hydrocarbon PM to $CO_2$ and $H_2O$, in contrast to the prior art that accumulates PM deposits that fall off from a filter housing into a separate waste catch or waste catch hopper for later removal through access ports. Similarly, DPF 510 does not require a hopper auger. Thus, DPF 510 has the advantage of eliminating the need for frequent waste removal. Prior art filters are necessarily very large due the high amount of particulate that is accumulated, which ultimately prevents this approach from being small enough for road transportation.

Exemplar SCR 520 may include, but are not limited to, catalyst-embedded ceramic filter, wet scrubber, thermal or plasma enhanced catalytic or non-catalytic NOx removal or NOx conversion systems, NOx Adsorber Catalysts (NAC), Passive NOx Adsorbers (PNA), and other technologies to reduce NOx adsorb NOx, or convert NOx into more benign compounds. Reagents for SCR 520 may include but are not limited to urea, anhydrous ammonia, or aqueous ammonia. Catalysts for SCR 520 may include, but are not limited to, Vanadium-Titanium (e.g., BASF VNX™ or zeolite ETZ™), Titania (e.g., Cormetech), Vanadium (e.g., Haldor Topsoe), Zeolite, Copper-Zeolite-based, Iron-Zeolite-based, and Titania-supported Vanadia (e.g., Johnson Matthey SINOx or DeNOx). The catalyst may be heated or not. SCR 520 may or may not also include an Ammonia Slip Catalyst (ASC) to prevent excessive ammonia slip.

Note that the placement of DPF 510 upstream of SCR 520 has the advantage of protecting SCR 520 from being coated with PM (as compared to the prior art which combines the filter element with the catalyst). Thus, the NOx removal efficiency of SCR 520 is protected and maintained over continued use.

Exemplar optional wet scrubber 530 is any packed bed scrubber known in the art, including any packing material known in the art, that provides sufficient gas/liquid contact between the exhaust gas and the absorbing solution. In some embodiments, high efficiency packing with the low pressure drop across the packing may be used to minimize the size and operating costs of the packed bed. The nozzles of exemplary wet scrubber 530 may also be any type of nozzle or any other equipment capable of distributing an absorbing solution over the packed bed. Alternative wet scrubber 530 may include, but are not limited to, vertical scrubbers, horizontal scrubbers, staged scrubbers, packed-bed scrubbers, ionized wet scrubbers (IWS), and quenchers. Materials for wet scrubber 530 may include but are not limited to, plastic, composite, and metal. Reagents for wet scrubber 530 may include but are not limited to, calcium, sodium, magnesium, or potassium-based alkaline reagents.

Exemplar optional $CO_2$ scrubber 550 is any packed bed scrubber known in the art, including any packing material known in the art, that provides sufficient gas/liquid contact between the exhaust gas and the absorbing solution. In some embodiments, high efficiency packing with the low-pressure drop across the packing may be used to minimize the size and operating costs of the packed bed. The nozzles of exemplary $CO_2$ scrubber 550 may also be any type of nozzle or any other equipment capable of distributing an absorbing solution over the packed bed. Alternative exemplary $CO_2$ scrubber 550 may include but are not limited to, vertical scrubbers, horizontal scrubbers, staged-scrubbers, packed-bed scrubbers, ionized wet scrubbers (IWS), $CO_2$ absorbers, and quenchers. Optional exemplary $CO_2$ scrubber 550 absorbs carbon dioxide ($CO_2$) from an exhaust stream using an absorbing solution, regenerates an alkaline component used in the absorbing solution, and produces the captured $CO_2$ as a salable gas or as a salable mineral. Reagents for exemplary $CO_2$ scrubber 550 may include but are not limited to, calcium, sodium, magnesium, or potassium-based alkaline reagents. Any mist eliminator design known in the art may also be added downstream of exemplary $CO_2$ scrubber 550 as required. $CO_2$ scrubber 550 may also use a membrane or ceramic interface between the reagent and the exhaust gas.

An alternative exemplary embodiment of optional $CO_2$ scrubber 550 works on the principle of compression and cooling of exhaust gas 401, ultimately processing exhaust gas 401 to a state where the $CO_2$ is separatable from the exhaust gas as a gas, liquid, or solid product.

Optional treatment systems for the reduction of VOC's or ROG's (not shown) comprise methods including, for example, incineration, absorbers, activated carbon filters, non-thermal plasma, and condensation.

Exemplary fan or blower 590 may include, but are not limited to, fans, blowers, multiple inline fans, multiple inline blowers (for increased pressure), centrifugal blowers, forward curved fans, backward curved fans, high-pressure fans, radial blade fans, plenum fans, axial fans, axial propeller fans, backward-inclined fans/blowers, induced draft (ID) fans, forced draft (FD) fans, and/or compressors known in the art. Fan or blower 590 must be sized appropriately to overcome the pressure drop through transportable exhaust capture system 400 and emissions reduction system 500 at the highest design flow rate and highest design exhaust gas temperature.

Figure 5:
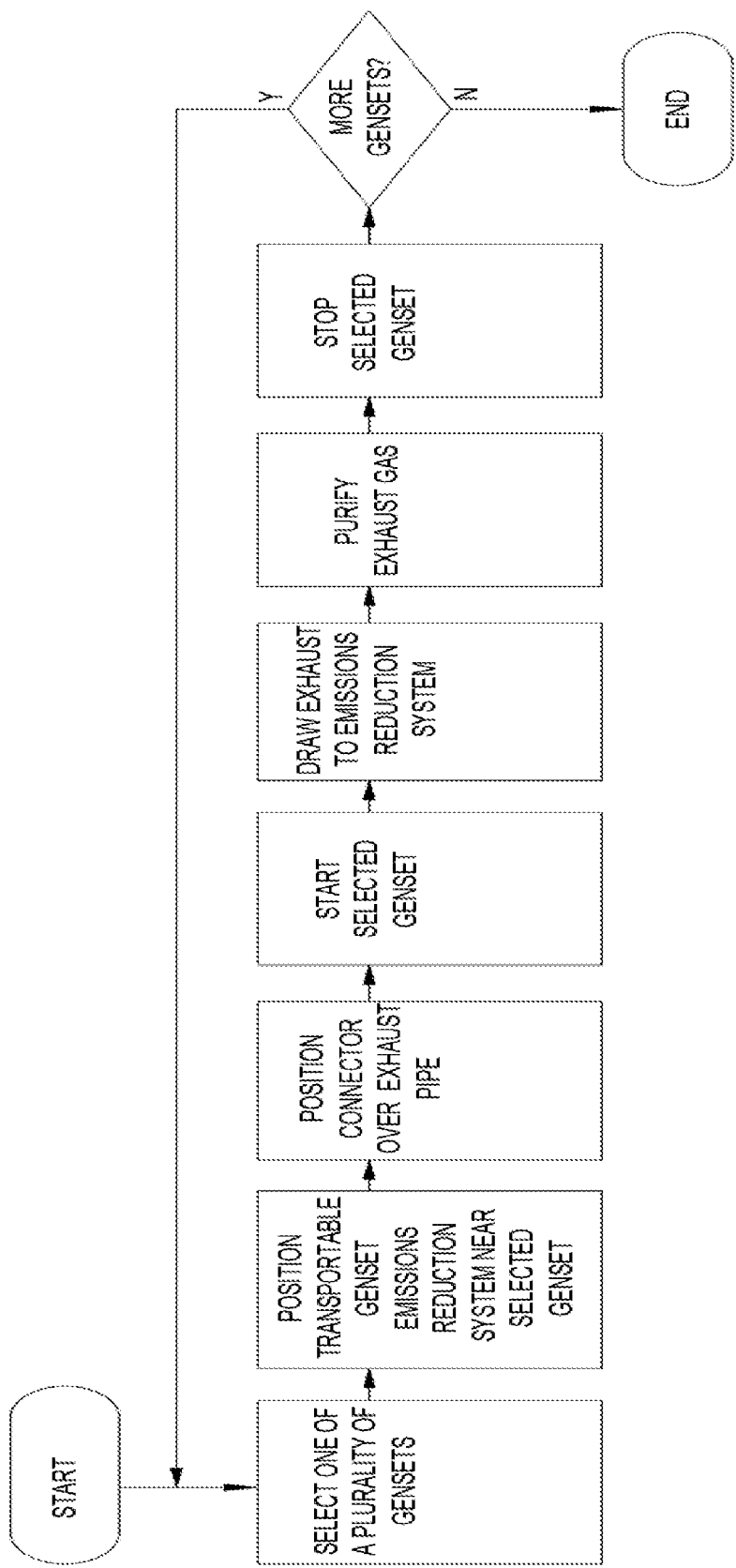
FIG. 5 shows a method of periodically testing a plurality of gensets one at a time using a transportable genset emissions reduction system (XGEN) 700.

FIG. 5 shows a method of periodically testing a plurality of gensets one at a time using a transportable genset emissions reduction system (XGEN) 700, whereby the emissions of each tested genset is reduced, thereby significantly reducing emissions from the plurality of gensets overall with the single, highly-efficient capital expenditure.

Figure 6:
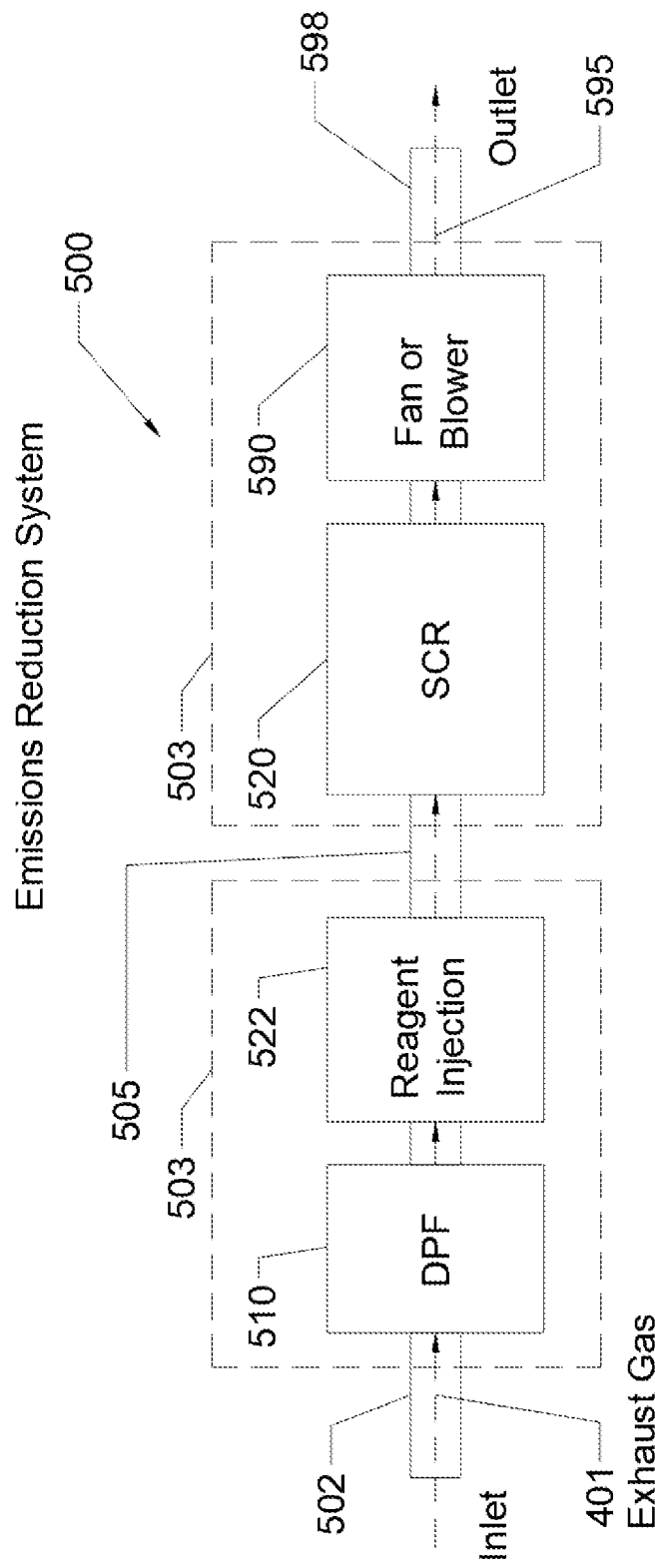
FIG. 6 is a block diagram of an alternative exemplary embodiment of an emissions reduction system 500 comprising a DPF 510 and reagent injection 522 in an upstream container 503 and an SCR 520 and fan 590 in a downstream container 503.

FIG. 6 shows a block diagram of stages of an exemplary embodiment of emissions reduction system 500, which contains an inlet 502 and an outlet 598. Emissions reduction system inlet 502 provides an entrance for exhaust gas 401. Emissions reduction system outlet 598 provides an exit for purified exhaust gas 595.

Another exemplary embodiment comprises a first container 503 comprising at least one of a diesel particulate filter (DPF) 510 and at least one reagent injection system 522. A second container 503 located downstream with an inlet connected to the outlet of the first container 503 with interconnecting duct 505. The second container 503 comprises selective catalytic reduction (SCR) 520 and a fan/blower 590. In contrast to FIG. 4, reagent injection system 522 is separate from SCR 520, whereas in FIG. 4 they are combined. The location of fan/blower 590 may be located anywhere along the gas path, including optionally in the upstream container 503, or separately in yet another container 503 (not shown). In this alternative exemplary embodiment, $SO_2$ and $CO_2$ are not required to be treated according to local regulation. Each container 503, in this alternative exemplary embodiment, is compatible and sized according to standard (e.g., ISO) 20-foot container dimensions which allows each container 503 to be mounted on a corresponding train of two 20-foot standard container chassis 503 to be pulled by a single tractor on public roads. Alternatively, two 20-foot standard containers 503 may be joined together to be compatible with the size and mountings of a single 40-foot container for transportation on a standard 40-foot container chassis to be pulled by a single tractor on public roads.

Emissions reduction system 500 is designed to meet the specific requirements of the specific application. Thus, emissions reduction system 500 may vary to include additional stages than shown for removing additional pollutants or fewer stages than shown if requirements are not as stringent. Various numbers of stages, functions of the stages, orders of the stages, or pollutant reduction process in any or all the stages may be utilized to construct an emissions reduction system 500. The stages shown in this block diagram can be arranged in an alternate order, and each of the stages may reside in any exhaust treatment container 503, and the quantity of exhaust treatment containers 503 may be more or less than shown in FIG. 6.

In FIG. 6, exemplar DPF 510 is the same as described under FIG. 4. Exemplar SCR 520 is the same as described under FIG. 4 except that reagent injection system 522 is separate from SCR 520, whereas in FIG. 4 they are combined. Thus, reagent injection system 522 is housed in the upstream container 503 and the remainder of SCR 520 is housed in the downstream container 503. Fan or blower 590 is the same as described under FIG. 4.

REFERENCE NUMERALS 100 genset
101 genset motor
110 exhaust duct
112 genset exhaust pipe
150 exhaust gas
180 optional genset exhaust treatment
182 optional genset oxidation catalyst
184 optional genset exhaust filter
186 optional genset SCR
300 transport system
310 truck/tractor
320 chassis
400 transportable exhaust capture system (TEX)
401 exhaust gas flow
410 capture system exhaust duct
430 connector
450 positioning apparatus
500 emissions reduction system
501 exhaust gas flow
502 emissions reduction system inlet
503 exhaust treatment container
505 interconnecting duct
510 diesel particulate filter (DPF)
520 selective catalytic reduction reactor (SCR)
522 reagent injection system
530 wet scrubber
550 $CO_2$ scrubber
560 Reactive Organic Gas (ROG) reduction system
590 fan or blower
595 purified exhaust gas flow
598 emissions reduction system outlet
700 transportable genset emissions reduction system (XGEN)

OPERATION

FIG. 1 shows a perspective view of an exemplary embodiment of XGEN 700 connected to a typical genset 100. Transport system 300, comprising truck 310 and chassis 320 allow XGEN 700 to be transportable. Each container 503 is mounted on rolling chassis 320. If multiple chassis 320 are needed, then each chassis 320 is connected to form a train of chassis 320. The train of chassis 320 is pulled by truck/tractor 310. Truck/tractor 310 may also serve as the power source for XGEN 700. An advantage of an exemplary embodiment XGEN 700 is that it may be easily transported from genset to genset, using public roads without unusual permitting or extraordinary means. Containers 503 are connected with flexible interconnecting duct 505 as a conduit for the exhaust gas. Containers 503 are also connected with flexible utility cables, comprising electrical utilities, fluid utilities, and signal cables. An exemplary embodiment of a transportable exhaust capture system (TEX) 400 comprises positioning apparatus 450, which is also transportable, as an example, a driving crane fitted with exhaust ducting 410. TEX 400 is typically transported separately from emissions reduction system 500 and these two systems are connected at the job site once they are in position.

Backup gensets 100 are typically tested every few weeks. During this testing, the gensets produce a cloud of black smoke that annoys residents living nearby and possibly violates local visible air pollution rules. The operator of genset 100 schedules an XGEN 700 to be connected before the test startup to genset 100 to prevent this black cloud of smoke. Once XGEN 700 is positioned next to genset 100 and connected, then genset 100 is started. The XGEN 700 processes and purifies the emissions, eliminates the startup smoke cloud and reduces noise. Smokeless, purified exhaust gas leaves emissions reduction system outlet 598. Once the test is complete and genset 100 is shut down; the XGEN 700 is moved to the next scheduled genset 100, repeating the cycle.

FIG. 2 shows a typical genset motor 101 that produces harmful exhaust gas 150 that contains harmful emissions such as particulate matter (PM), oxides of nitrogen (NOx), oxides of sulfur (SOx), and the greenhouse gas carbon dioxide ($CO_2$).

If optional emissions treatment system 180 is installed, then the amount of harmful emissions is reduced to some extent. If included within emissions treatment system 180, an oxidation catalyst is typically used to increase the amount of $NO_2$ by oxidizing NO to $NO_2$. $NO_2$ is useful to help passively regenerate exhaust filter 184 since regeneration can occur at a lower temperature using $NO_2$ instead of $O_2$. Optional exhaust filter 184 is typically a diesel particulate filter (DPF) and is used to reduce the amount particulate matter (PM) in exhaust gas 150. Optional selective catalytic reduction reactor (SCR) 186 is used to reduce NOx in the exhaust gas. An apparatus to remove SOx and $CO_2$ is typically not installed as part of an optional emissions treatment system 180. Even if an optional emissions treatment system 180 is installed, there is typically a significant amount of PM, NOx, SO2, and $CO_2$ is not treated, because a highly-efficient treatment system would be too expensive for a system that only serves a single genset. However, since the capital expenditure of XGEN 700 can be shared by many gensets, then a highly-efficient treatment system is economically feasible, thereby providing the advantage of reducing nearly all the remaining PM, NOx, SOx, and most of the $CO_2$ that is missed by optional emissions treatment system 180.

An advantage of XGEN 700 is that it can easily be transported from genset to genset during periodic scheduled backup genset testing. FIG. 3 shows XGEN 700 connected to a typical genset 100 with optional genset emissions treatment 180. Connector 430 is positioned over exhaust pipe 112 to collect exhaust gas 150. Exhaust pipe 112 is typically oriented vertically with the outlet significantly above the ground to sufficiently disperse the exhaust gas, thereby reducing hazardous concentrations of exhaust gas in the breathing space near ground level. This vertical orientation makes it easy to form a connector 430 (e.g., an inverted funnel), that is lowered over exhaust pipe 112 by means of a supporting apparatus such as a crane or a mechanical arm. Transportable exhaust capture system (TEX) 400 comprises the supporting apparatus, connector 430, and capture system exhaust duct 410. The downstream aspect of exhaust duct 410 is a flexible duct that can be easily connected to emissions reduction system inlet 502. Once connector 430 is within reach of exhaust pipe 112 and the flexible outlet of capture system exhaust duct 410 is sufficiently close to inlet 502 of emissions reduction system 500, TEX 400 and emissions reduction system 500 are connected, enabling operation of XGEN 700. Next, XGEN 700 is started with fan/blower 590 is set to a sufficient speed to draw a sufficient amount of exhaust gas 150 into connector 430. Next, connector 430 is lowered sufficiently over exhaust pipe 112 to maximize the capture of emissions. Exhaust gas 150 is collected by connector 430, transmitted through TEX 400 into emissions reduction system 500 to produce a purified exhaust gas flow 595. Purified exhaust gas flow 595 exits emissions reduction system 500 via outlet 598 to the atmosphere.

During a typical work shift, XGEN 700 is connected to multiple gensets, scheduled one after the other. A periodic test of a genset 100 typically lasts thirty minutes to two hours. An advantage of XGEN 700 is that it remains at operating temperature between tests and does not require a warmup between each test. Thus, XGEN 700 has the advantage of controlling emissions immediately once genset 100 starts, even when optional genset emissions treatment 180 is not sufficiently warm to reduce NOx. Thus, XGEN 700 has an advantage of reducing emissions that would otherwise be released into the atmosphere during a cold start of genset 100.

FIG. 4 is a block diagram showing an exemplary embodiment of emissions reduction system 500 comprising five stages as follows: a diesel particulate filter (DPF) 510, selective catalytic reduction (SCR) 520, wet scrubber 530, $CO_2$ scrubber 550, and fan/blower 590.

Diesel particulate filter (DPF) 510 is used to remove particulate matter (PM) from exhaust gas 401. Selective catalytic reduction reactor (SCR) 520 is used to remove NOx from exhaust gas 401. Wet scrubber 530 is used to remove SOx from exhaust gas 401. $CO_2$ scrubber 550 is used to remove carbon dioxide ($CO_2$) from exhaust gas 401.

Fan or blower 590 pulls exhaust gas 401 through transportable exhaust capture system (TEX) 400 and emissions reduction system 500. Fan or blower 590 is operated to provide zero or slightly negative back pressure on the connected genset to prevent the escape of a partial stream of exhaust gas 401.

In an exemplary embodiment, the major components of emission treatment system 500 are installed into containers 503. In FIG. 4, two containers 503 are shown. However, the number of containers 503 varies depending on the size and number of the major components used. When there is more than one container 503, then interconnecting duct 505 is used to transmit the exhaust gas from one container 503 to the next. Interconnecting duct 505 is typically a flexible duct to allow relative motion between containers 503.

Purified exhaust gas 595 exits emissions reduction system 500 through outlet 598. Purified exhaust gas 595 will typically contain very low concentrations of PM, NOx, and SOx and a reduced amount of $CO_2$.

A disadvantage of repeated routine cold test starting of diesel gensets is that diesel particulate filters (DPF's) tend to clog with organic particulate matter because the duration within the regeneration temperature range is insufficient. For this reason, gensets with DPF's installed must run a minimum of 30 minutes to two hours to allow the genset to warm up completely and give the DPF sufficient time to regenerate. A disadvantage of this extended runtime is that it increases the amount of runtime needed for routine testing of these gensets, resulting in more greenhouse gas production and increased cost due to wasted fuel and increased time spent during routine periodic testing. An advantage of XGEN 700 is that the temperature of DPF 510 remains sufficiently high between consecutive startups of gensets 100, thereby allowing DPF 510 to regenerate sufficiently and thereby significantly reducing the risk of DPF clogging. Thus, in the case where gensets 100 do not contain optional genset emissions treatment 180, these gensets are not required to run a full 30 minutes to 2 hours because they contain no DPF, thereby having an advantage of reduced cost, (when used in conjunction with XGEN 700), resulting in reduced capital expenditure, reduced maintenance cost, reduced test time, reduced fuel use, and reduced greenhouse gas production.

A further disadvantage of the repeated routine cold test starting of diesel gensets is that selective catalytic reaction reactors (SCR's) do not operate until sufficiently warmed up. Significantly increased NOx emissions during the warm-up period of genset 100 results from routine cold startup tests. An advantage of XGEN 700 is that the temperature of SCR 520 remains sufficiently high between consecutive routine test startups of gensets 100, thereby allowing SCR 520 to operate efficiently (reducing NOx) throughout a startup of genset 100.

For gensets that include optional genset emissions treatment 180, the minimum runtime is approximately 30 minutes to two hours to fully test the function of optional SCR 186. A disadvantage of this extended runtime is that it increases the amount of runtime needed for routine testing of these gensets, resulting in more greenhouse gas production and increased cost due to wasted fuel and increased time spent during routine periodic testing. An advantage of XGEN 700 is that it can efficiently eliminate NOx during routine genset testing, even if genset 100 does not include optional genset emissions treatment 180. Thus, gensets 100 without optional genset emissions treatment 180 have an advantage of reduced cost, (when used in conjunction with XGEN 700), because of the reduced capital expenditure, reduced maintenance cost, reduced test time, reduced fuel use, and reduced greenhouse gas production. A further advantage of using XGEN 700 for older backup gensets that are not equipped with optional genset emissions treatment 180 is an extended useful life of these older backup gensets. When used with XGEN 700, these older backup gensets can be routinely tested without producing harmful emissions, thereby delaying the purchase of newer gensets with optional emissions treatment 180, thus delaying considerable capital expenditure while also reducing emissions.

A disadvantage of a typical optional genset emissions treatment 180 is that it does not include SOx reduction. Reduction of SOx is important because SOx is a cause of acid rain and SOx can be a precursor to particulate matter. The advantage of emissions reduction system 500 as shown in FIG. 4 is the use of wet scrubber 530, which makes SOx reduction cost-effective because a single capital expenditure for wet scrubber 530 is shared with a multitude of gensets 100.

A disadvantage of a typical optional genset emissions treatment 180 is that it does not include $CO_2$ reduction. Reduction of $CO_2$ is becoming increasingly important because it is a greenhouse gas that causes global warming. The advantage of emissions reduction system 500 as shown in FIG. 4 is that $CO_2$ scrubber 550 removes $CO_2$ from the exhaust stream that would otherwise be released into the atmosphere. This $CO_2$ reduction capability is made practical and cost-effective since a capital expenditure for a scrubber 550 can easily be justified for XGEN 700 because a single capital expenditure is shared with a multitude of gensets 100. A further advantage is that the removed $CO_2$ may be separated as a saleable gas or solid product, thereby providing revenue.

FIG. 5 illustrates a method to test a plurality of gensets using a single transportable genset emissions reduction system (XGEN) 700, whereby a significant amount of emissions is reduced from the plurality of gensets using a single, highly-efficient capital expenditure, thereby resulting in increased overall emissions reductions at a reduced cost.

First, a plurality of gensets, located near each other or within driving range of each other, (the Group) may be serviced by a single transportable genset emissions reduction system (XGEN) 700. Each genset within the Group is scheduled such that one genset may be operated at a time, with sufficient time allocated in between the testing of each genset, thereby allowing XGEN 700 to service each genset within the Group one at a time.

When a genset 100 is selected to be tested, transportable exhaust capture system (TEX) 400 is positioned sufficiently near exhaust pipe 112 of genset 100, such that connector 430 is within reach of exhaust pipe 112. Transport system 300, on which emissions reduction system 500 is securely mounted, is moved sufficiently close to TEX 400, such that emissions reduction system 500 may be connected to TEX 400.

Then, once XGEN 700 is sufficiently near selected genset 100 as described above, and all interconnections are made, then connector 430 is positioned over exhaust pipe 112 of genset 100, and XGEN 700 is activated to accept exhaust from selected genset 100.

Then, the test is initiated for selected genset 100 is started, thereby producing exhaust gas 150.

Then, XGEN 700 draws the produced exhaust gas 150 to emissions reduction system 500.

Then, emissions reduction system 500 purifies exhaust gas 150 thereby reducing emissions from exhaust gas 150 producing a purified exhaust gas 595.

Then, once the test of selected genset 100 is complete, genset 100 is stopped.

Then, if there are more gensets to be tested, then the cycle repeats, beginning by moving XGEN 700 to the next-selected genset.

FIG. 6 is a block diagram showing an alternative exemplary embodiment of emissions reduction system 500 comprising a first upstream container 503 comprising a diesel particulate filter (DPF) 510 and a reagent injection system 522. A second downstream container 503 comprises a selective catalytic reduction (SCR) 520 (without reagent injection 522) and fan/blower 590. Otherwise, emissions reduction system 500 comprising TEX 400, DPF 510, SCR 520, and fan/blower 590 operate as described in FIG. 4.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

CONCLUSIONS

Accordingly, several advantages of one or more aspects are as follows:

A device and method to reduce emissions from a plurality of gensets using a single transportable genset emissions reduction system (XGEN) 700, whereby a significant amount of emissions is reduced from the plurality of backup gensets using a single, highly-efficient capital expenditure, thereby resulting in increased overall emissions reductions at a reduced cost.

Given that power blackouts occur very infrequently, a TRANSportable GENset emissions reduction system (XGEN) 700 that fixes the larger and more significant problem of reducing emissions from routine periodic testing of backup gensets, rather than during a power blackout, whereas XGEN 700 may be scheduled to be shared by a multitude of gensets, thereby reducing costs through efficient use of capital expenditures while also increasing the quality of emissions reductions as compared to applying fixes to said multitude of backup gensets individually.

A further advantage being that XGEN 700 may be transported from genset to genset via public roads, thereby enabling XGEN 700 to service a plurality of gensets within a large geographic area, instead of just within a single private property.

For older pre-existing backup gensets, which are tested periodically, and DO NOT have emissions controls installed, in which XGEN 700 may be scheduled to be used by said gensets during said periodic tests:

(a) XGEN 700 eliminates the large black cloud of smoke that would otherwise occur during a cold start, thereby reducing complaints from nearby neighborhoods.

(b) XGEN 700 extends the useful life of older gensets, eliminating the need to purchase new gensets with emissions controls, while significantly reducing overall emissions from said backup genset, thereby saving the capital cost to purchase a new genset or retrofit while also reducing PM, NOx, SOx, VOC, ROG, and $CO_2$ emissions.

(c) XGEN 700 reduces the periodic test time, if said gensets would otherwise have been retrofitted with DPF 184, said retrofit requiring that said genset/DPF run longer per test (up to two hours) to fully regenerate said DPF 184. XGEN 700 does not require a long regeneration time, therefore reducing test time/labor cost, fuel cost, while also reducing PM, NOx, SOx, VOC, ROG, and $CO_2$ emissions.

(d) XGEN 700 reduces motor exhaust noise during said periodic tests.

For older pre-existing backup gensets, which are tested periodically, and have emissions controls installed, in which XGEN 700 may be scheduled to be used by said gensets during said periodic tests:

(a) XGEN 700 removes PM that bypasses said emissions controls, whereas PM filters of said pre-existing emissions controls are not highly efficient.

(b) XGEN 700 removes NOx that bypasses the genset's built-in emissions controls, whereas NOx reduction of said pre-existing emissions controls is not effective during the predominant startup phase of periodic testing.

(c) XGEN 700 cost-effectively removes SOx, VOC, and ROG emissions, whereas SOx or VOCs or ROGs is not reduced by said pre-existing emissions controls.

(d) XGEN 700 cost-effectively capture $CO_2$ emissions, whereas $CO_2$ is not reduced by said pre-existing emissions controls.

(e) Furthermore, said captured $CO_2$ emissions may be separated as a saleable gas or solid product, thereby providing revenue to compensate for part of the cost to reduce said $CO_2$ emissions.

(f) XGEN 700 reduces motor exhaust noise during said periodic tests.

An exemplary embodiment of TRANSportable GENset emissions reduction system (XGEN) 700 with a transport system 300 having an advantage of being compatible with road transportation, thereby allowing XGEN 700 to easily move from genset to genset on standard roads to allow XGEN 700 to be used on a multitude of gensets that may be scheduled to run at different times.

(a) The ability to periodically test a multitude of gensets using a pre-determined schedule provides the advantage of efficient use of capital expenditures, thereby significantly improving the cost-effectiveness of reducing overall pollution within a local geographic area that contains the multitude of gensets.

(b) Furthermore, an embodiment of XGEN 700 that conforms to universal transportation standards (e.g., ISO shipping container format) having the advantage of fast and inexpensive shipment to any location in the world via container trucks, container trains, and container ships, thereby eliminating expensive and time-consuming modifications to a multitude of gensets 100.

RAMIFICATIONS

In the case of mobile sources such as oceangoing vessels (OGV's) or ships, significant emissions may be concentrated around a port where ships stay at berth for a period of time with auxiliary gensets running. These ships many times do not have emissions controls, and it would be too expensive to retrofit all the ships with individual emission control systems. An advantage of an XGEN 700 is ability to move from berth to berth within a private terminal, and also to move from terminal to terminal via public roads and also to move from berth to berth within the same terminal via public roads, and also to move XGEN 700 onto a barge in order to service ships from the water-side of the ships, thereby reducing PM, NOx, SOx, VOC, ROG, and/or $CO_2$ emissions from ships that would have otherwise been released into the atmosphere and/or saving cost compared to additional non-transportable emissions reduction systems.

In the case of mobile sources such as locomotives, significant emissions may be concentrated around a railyard where locomotives stay idling for a period of time motor-generators running. These locomotives many times do not have emissions controls, and it would be too expensive to retrofit all the locomotives with individual emission control systems or replace the locomotives with cleaner locomotives. An advantage of an XGEN 700 is ability to move from locomotive to locomotive within a railyard, and also to move from railyard to railyard via public roads and also to move to different locomotives on the same railyard via public roads, thereby enabling an XGEN 700 to reduce emissions from locomotives that would otherwise release PM, NOx, SOx, and/or $CO_2$ into the atmosphere and/or save the cost of additional non-transportable emissions reduction systems.

What is claimed is:

1. A road-transportable genset emissions reduction system comprising:
a connector configured to temporarily couple to an exhaust pipe of a genset producing exhaust gas;
a road-transportable exhaust treatment container for purifying said exhaust gas from said genset, said exhaust treatment container having length, width and height dimensions conforming to a universal standard for a shipping container;
an exhaust treatment system contained within said exhaust treatment container and configured to purify said exhaust gas from said genset;
said exhaust treatment container comprising an inlet and an outlet, the inlet connected to an input of the exhaust treatment system, the outlet connected to an output of the exhaust treatment system;
a public-road-transportable chassis configured to mount said exhaust treatment container for transportation on public roads in a transport mode;
wherein the chassis and said exhaust treatment container as mounted together have an overall height which meets maximum height limits to be moved over public roads without special permitting;
said exhaust treatment container mounted on said chassis;
an inlet duct configured to convey said exhaust gas from said connector to said inlet of said exhaust treatment container;
a crane configured to support said connector and said inlet duct, the crane configured to position the connector in relation to said exhaust pipe of said genset, the crane configured for transport over standard roads;
the exhaust treatment system configured to treat said exhaust gas in an operating mode to reduce selected pollutants from said exhaust gas.

2. The road-transportable genset emissions reduction system of claim 1, wherein said crane is selected from the group consisting of a driving crane, a mobile articulating crane, a combination of articulating and telescopic mobile crane, and a converted mobile concrete pumping crane.

3. The road-transportable genset emissions reduction system of claim 1, whereas said transportable genset emissions reduction system is configured to be sequentially shared with a plurality of backup gensets.

4. The road-transportable genset emissions reduction system of claim 1, whereas exhaust treatment provided by the exhaust treatment system reduces the mass flow rate of particulate matter from said genset.

5. The road-transportable genset emissions reduction system of claim 4, whereas the reduction of particulate matter utilizes a diesel particulate filter that is configured to be regenerated and the regeneration of said diesel particulate filter is selected from the group consisting of passive regeneration, passive regeneration using nitrogen dioxide, active regeneration, active regeneration using an electrical current through metal media, and active regeneration with electric heat.

6. The road-transportable genset emissions reduction system of claim 5, whereas said diesel particulate filter is selected from the group consisting of ceramic honeycomb, catalyst-embedded ceramic filters, thermal oxidizers, ceramic filter elements, high temperature composite ceramic filter, filter elements comprising ceramic fibers, electrostatic precipitators, woven metal or ceramic media, ceramic foams, metal sintered filters, metallic foams, fiber wound filters, fiber knit filters, fiber woven filters, bound ceramic fibers, filter paper, filter felts, filter fleece, carbon filters, HEPA filters, vacuum filters, wall-flow filters and/or partial-flow filters.

7. The road-transportable transportable genset emissions reduction system of claim 1, whereas exhaust treatment provided by the exhaust treatment system is configured to reduce the mass flow rate of oxides of nitrogen from said genset.

8. The road-transportable transportable genset emissions reduction system of claim 7, further comprising a reagent and a catalyst, said reagent is selected from the group consisting of urea and anhydrous ammonia, and said catalyst is selected from the group consisting of Vanadium-Titanium, Titania, Vanadium, Zeolite, Copper-Zeolite-based, Iron-Zeolite-based, and Titania-supported Vanadia.

9. The road-transportable genset emissions reduction system of claim 1, whereas said exhaust treatment provided by the exhaust treatment system reduces the mass flow rate of oxides of sulfur from said genset.

10. The road-transportable genset emissions reduction system of claim 1, whereas exhaust treatment provided by the exhaust treatment system is configured to reduce the mass flow rate of volatile organic compounds from said genset.

11. The road-transportable genset emissions reduction system of claim 1, whereas said exhaust treatment system is configured to reduce the mass flow rate of reactive organic gases from said genset.

12. The road-transportable genset emissions reduction system of claim 1, whereas said exhaust treatment system is configured to reduce the mass flow rate of carbon dioxide from said genset.

13. The road-transportable genset emissions reduction system of claim 12, whereas said exhaust treatment system is configured to separate said carbon dioxide as a gas product, liquid product, or a solid product.

14. The road-transportable genset emissions reduction system of claim 1, whereas said exhaust treatment system comprises a fan or blower.

15. The road-transportable genset emissions reduction system of claim 1, whereas said transportable genset emissions reduction system reduces noise from said genset.

16. The road-transportable genset emissions reduction system of claim 1, whereas said exhaust treatment container is less than 53 feet long, 10 feet wide, and 9.5 feet tall.

17. A method for reducing emissions from a plurality of gensets using the road-transportable genset emissions reduction system of claim 1, the method comprising:
(i) coupling the connector to an exhaust pipe of a first of the plurality of gensets to capture an exhaust gas using the crane;
(ii) drawing said exhaust gas through the inlet duct to an exhaust treatment container;
(iii) purifying said exhaust gas with the exhaust treatment system to reduce selected pollutants;
(iv) transporting the connector, the inlet duct and the exhaust treatment container with the exhaust treatment system over public or private roads to another of the plurality of gensets;
(v) repeating steps (i) through (iv) to sequentially conduct emission treatment operation on other gensets of the plurality of gensets.

18. The road-transportable genset emissions reduction system of claim 1, wherein said system is configured to process emissions from land-based gensets.

19. The road-transportable genset emissions reduction system of claim 1, the container has a height no larger than that of a standard single-height container.

20. A method for reducing emissions from a plurality of land-based gensets, the method comprising:
(i) coupling a connector to an exhaust pipe of a first of the plurality of gensets to capture an exhaust gas using a crane;
(ii) drawing said exhaust gas through a duct to at least one exhaust treatment container;
(iii) purifying said exhaust gas with an exhaust treatment system housed within the at least one container to reduce selected pollutants;
(iv) transporting the connector, the duct and the at least one exhaust treatment container with the exhaust treatment system over public or private roads to another of the plurality of land-based gensets;
(v) repeating steps (i) through (iv) to sequentially conduct emission treatment operation on other gensets of the plurality of land-based gensets.

* * * * *